(12) United States Patent
Kostyukov

(10) Patent No.: US 9,754,176 B2
(45) Date of Patent: Sep. 5, 2017

(54) METHOD AND SYSTEM FOR DATA EXTRACTION FROM IMAGES OF SEMI-STRUCTURED DOCUMENTS

(71) Applicant: ABBYY Development LLC, Moscow (RU)

(72) Inventor: Mikhail Kostyukov, Moscow (RU)

(73) Assignee: ABBYY PRODUCTION LLC, Moscow (RU)

( * ) Notice: Subject to any disclaimer, the term of this patent is extended or adjusted under 35 U.S.C. 154(b) by 0 days.

(21) Appl. No.: 14/868,683

(22) Filed: Sep. 29, 2015

(65) Prior Publication Data
US 2017/0068866 A1   Mar. 9, 2017

(30) Foreign Application Priority Data

Sep. 7, 2015 (RU) ................................ 2015137956

(51) Int. Cl.
*G06K 9/18* (2006.01)
*G06K 9/46* (2006.01)

(52) U.S. Cl.
CPC ............. *G06K 9/18* (2013.01); *G06K 9/4604* (2013.01)

(58) Field of Classification Search
CPC ........ G06K 9/18; G06K 9/4604; G06K 9/469; G06K 9/6281; G06K 9/6282; G06K 2209/01
See application file for complete search history.

(56) References Cited

U.S. PATENT DOCUMENTS

| | | | | | |
|---|---|---|---|---|---|
| 5,067,165 | A | * | 11/1991 | Nishida | G06K 9/68 382/195 |
| 5,862,259 | A | * | 1/1999 | Bokser | G06K 9/344 382/156 |
| 2001/0019629 | A1 | * | 9/2001 | Navoni | G06F 17/30985 382/229 |
| 2008/0267505 | A1 | * | 10/2008 | Dabet | G06F 17/243 382/181 |
| 2009/0067756 | A1 | * | 3/2009 | Meyer | G06K 9/03 382/310 |
| 2015/0356365 | A1 | * | 12/2015 | Collet | G06K 9/18 382/177 |

* cited by examiner

*Primary Examiner* — Yon Couso
(74) *Attorney, Agent, or Firm* — Lowenstein Sandler LLP

(57) ABSTRACT

The present invention is directed to a method of extracting data from fields in an image of a document. In one implementation, a text representation of the image of the document is obtained. A graph for storing features of the text fragments in the text representation of the image of the document and their links is constructed. A cascade classification for computing the features of the text fragments in the text representation of the image of the document and their link is run. Hypotheses about the belonging of text fragments to the fields in the image of the document are generated. Combinations of the hypotheses are generated. A combination of the hypotheses is selected. And data from the fields in the image of the document is extracted based on the selected combination of the hypotheses.

19 Claims, 8 Drawing Sheets

METHOD AND SYSTEM FOR DATA EXTRACTION FROM IMAGES OF SEMI-STRUCTURED DOCUMENTS

CROSS REFERENCE TO RELATED APPLICATIONS

The present application claims the benefit of priority under 35 USC 119 to Russian Patent Application No. 2015137956, filed Sep. 7, 2015; the disclosure of which is herein incorporated by reference in its entirety for all purposes.

FIELD OF THE INVENTION

The present invention relates to the field of data extraction from images of documents by means of Optical Character Recognition (OCR). More specifically, the present invention relates to utilizing graph based approach, the cascade classification approach, as well as a reduced alphabet approach, to reduce fields' identification errors in processing textual information in the images of documents.

BACKGROUND OF THE INVENTION

For semi-structured documents like checks, business cards, passport (of different countries), credit cards, it is common to have a variety of location of the fields from copy to copy. The known methods of identification for such fields in semi-structured documents are based on a <<greedy algorithm>>—all the fields are searched for in the text in a given order. If a fragment of the text is identified as a field, this fragment is not considered in subsequent search procedures. This approach imposes harsh obligations on the quality of work for the first field search procedures and degrades the quality of work of the subsequent field search procedures. The first field search procedure makes a decision about whether a text fragment is a searched filed of a semi-structured document or not without any information about the results of subsequent search procedures or about the document as a whole. As a result the fields are often identified incorrectly.

To solve this problem we propose a method described herein using a graph structure. The graph enables us to save the results of all search procedures and to implement an examination of different combinations of the fields during further analysis of the search results. Besides our method allows to organize the work of the field search procedures by cascade classification, which allows us to save computational resources and to calculate only the required number of features for display. Also our method uses a reduced alphabet technique for generating dictionaries of keywords, which decreases the number of mistakes in the fields identifying by the search procedure employing the dictionaries of keywords.

SUMMARY OF THE INVENTION

The present invention is directed to a method of extracting data from fields in an image of a document. In one implementation, a text representation of the image of the document is obtained. A graph for storing features of the text fragments in the text representation of the image of the document and their links is constructed. A cascade classification for computing the features of the text fragments in the text representation of the image of the document and their link is run. Hypotheses about the belonging of text fragments to the fields in the image of the document are generated. Combinations of the hypotheses are generated. A combination of the hypotheses is selected. And data from the fields in the image of the document is extracted based on the selected combination of the hypotheses.

DETAILED DESCRIPTION OF THE INVENTION

In the context of the present invention the term "field" means information in a document that needs to be identified and extracted from the document.

Figure 1:
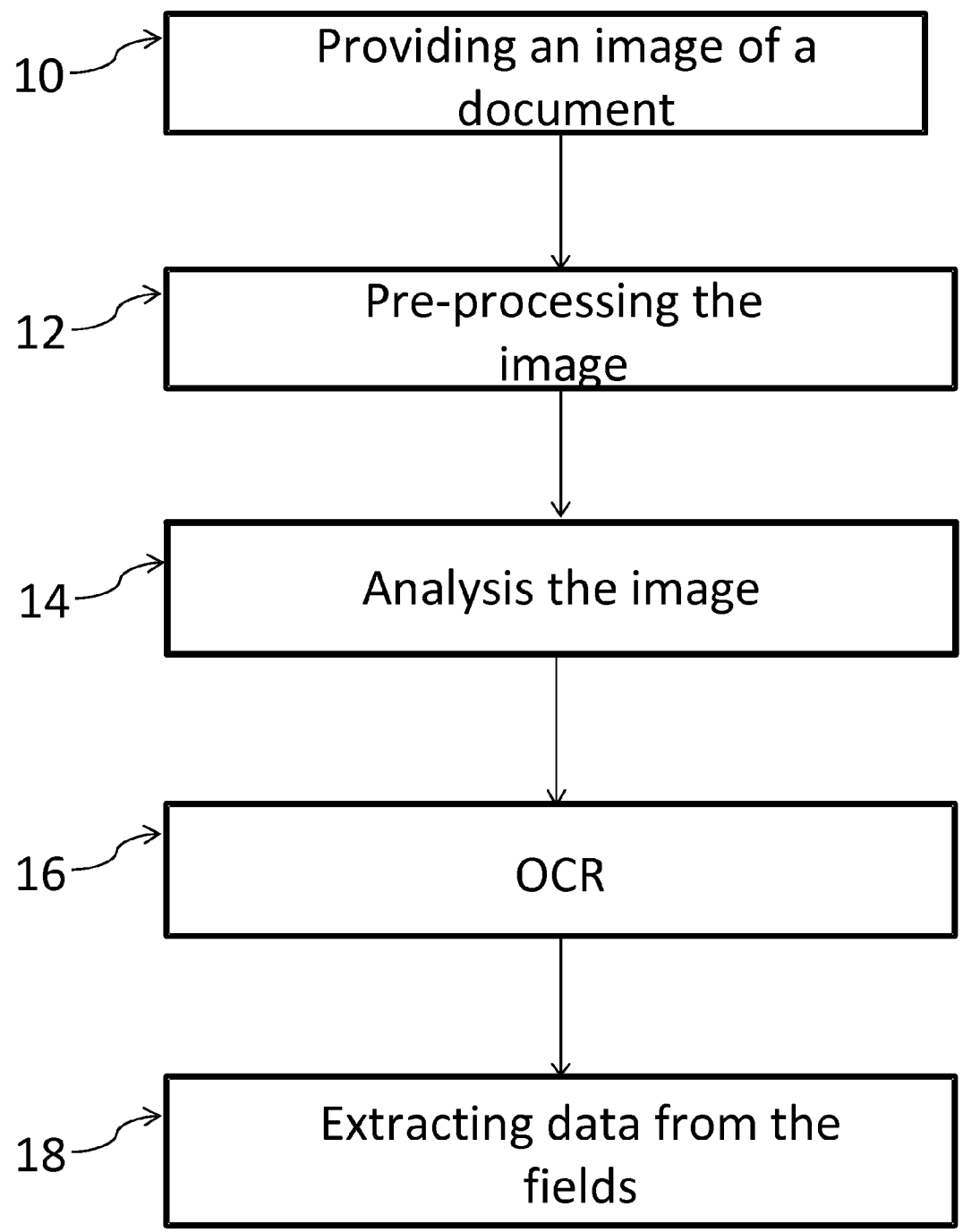
FIG. 1 illustrates the method of automated extraction of meaningful information from a semi-structured document.

Shown in FIG. 1 is a general illustration of the method of automated extraction of meaningful information from an image of a semi-structured document. The semi-structured document—is a document containing a set of information fields (a document element intended for data extraction) whose design, number and layout may vary significantly in different versions of the document. An example of such semi-structured document could be a sales receipt or a business card, although the present method and corresponding system should not be limited to sales receipts or business cards. At step 10 an image of a document is provided to be input into the system. At step 12 the image is pre-processed at a stage of preliminary image processing which serves to reduce noise and various image imperfections, as well as to adjust the image quality to make it suitable for further processing. Further processing at step 14 involves document analysis to determine the physical structure of the analyzed document, such as, for example, text blocks, presence or absence of a table, and so on. At step 16 optical character recognition of the document is performed (conversion of images of typewritten or printed text into machine-encoded text). Step 18 represents an entity (field) extraction step of the document processing method of the present invention.

Figure 2:
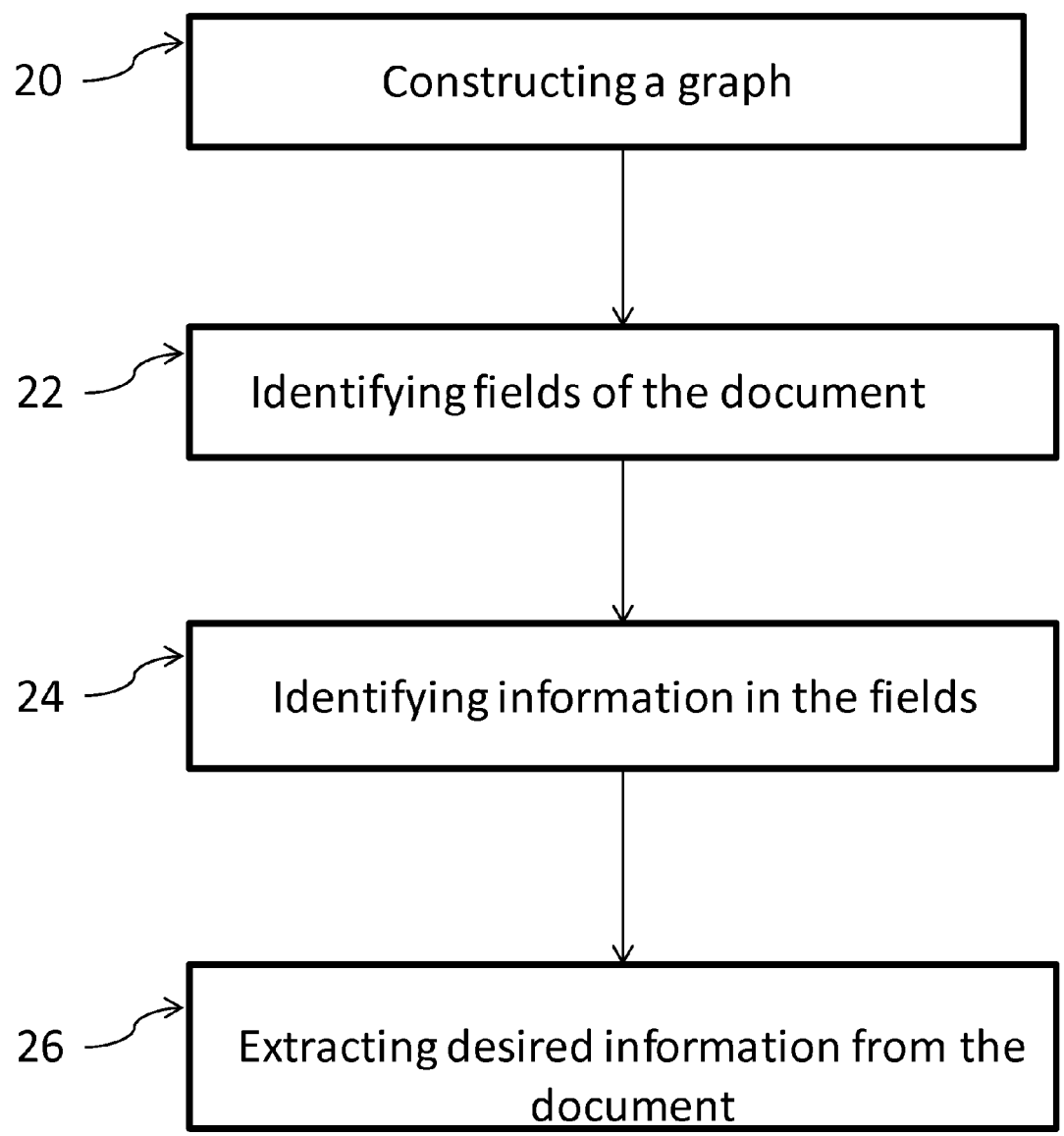
FIG. 2 illustrates the key steps of the entity extraction.

FIG. 2 illustrates the key steps of the entity (fields) extraction step 18 in FIG. 1. Step 20 in FIG. 2 illustrates constructing a graph as a structure for storing numerical characteristics of the fragments of the text and their links. Step 22 in FIG. 2 shows identification of the fields in the image of the document by utilizing the method of cascade classification. Fields in a document may be simple (without an internal structure, e.g. value of the goods) or composite (with an internal structure, e.g. an address field). Therefore in step 24 in FIG. 2 the components of fields are identified by using, for example, regular expressions, key words and other information that is of interest. Extraction of the desired identified information (data) is illustrated in step 26 of FIG. 2.

Figure 5:
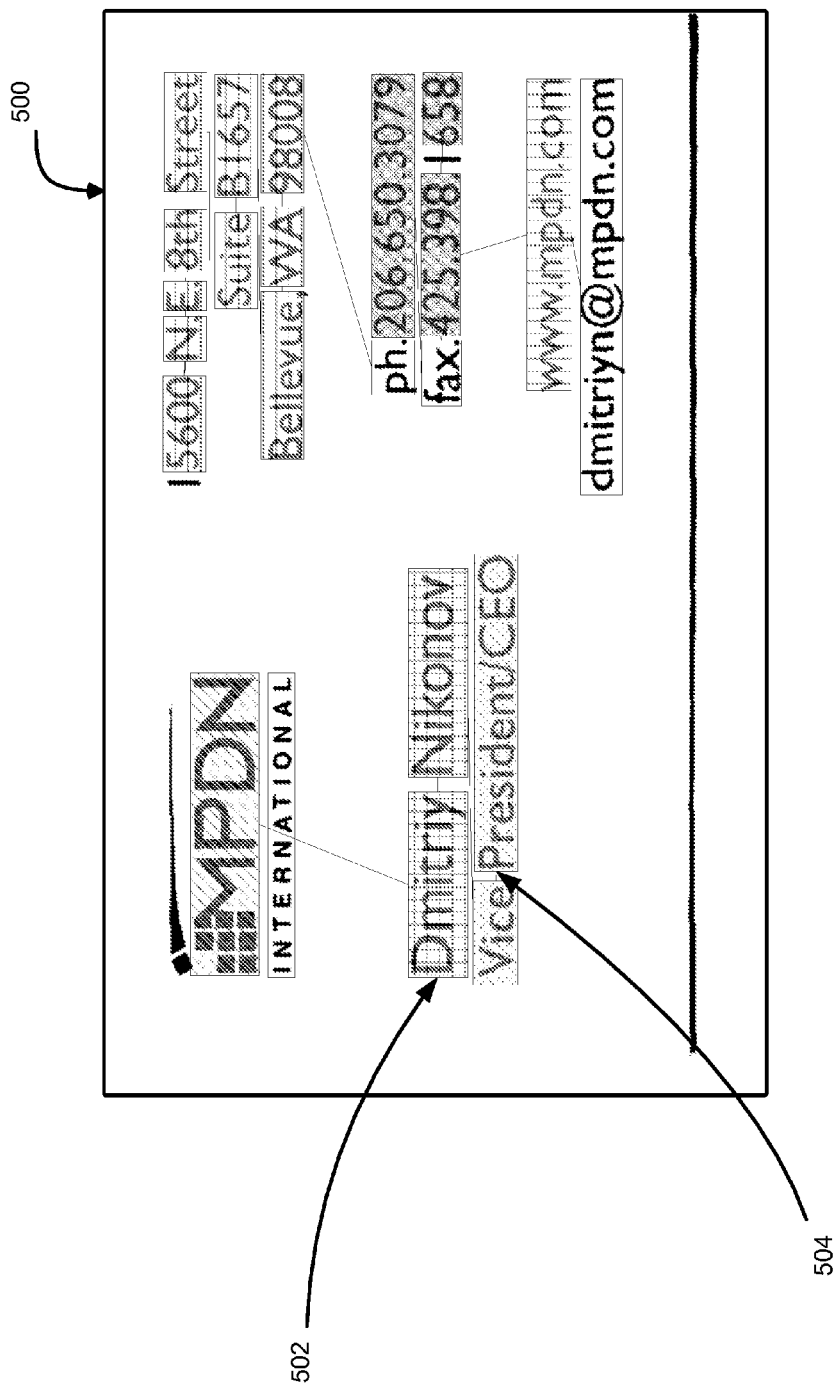
FIG. 5 illustrates an example of graph constructed for a business card.

The structure, which is used for storing various characteristics of a text representation of an image of a document, is represented by a graph. The text representation is a result of an optical character recognition (OCR) of the document image. FIG. 5 illustrates a graph constructed for a business card. The text representation of the business card (500) is represented in the form of a graph. The nodes (502) of such graph comprise text fragments of the document being analyzed. The nodes of the graph also comprise numerical characteristics of the text fragments. The nodes of the graph are compared with the fields in the document during document analysis. The nodes of the graph are connected by edges (504), which store numerical characteristics of logical connections (links) between the text fragments. In one embodiment each node of the graph is matched with one word in the text and the edges in the graph set linear order of the words in the text. The linear order is a supposed reading order of text in a document that depends on language of the document (For example, for English documents the reading order of text is from left to right; for Hebrew—from right to left). Each word has a corresponding node. During the analysis of the text that is described in details below, two or more nodes may be merged together or one node can be split into two or more new nodes. The edges between the nodes may also be removed or added, the numerical characteristics of the nodes (text fragments) and edges (links) may be changed.

Figure 3:
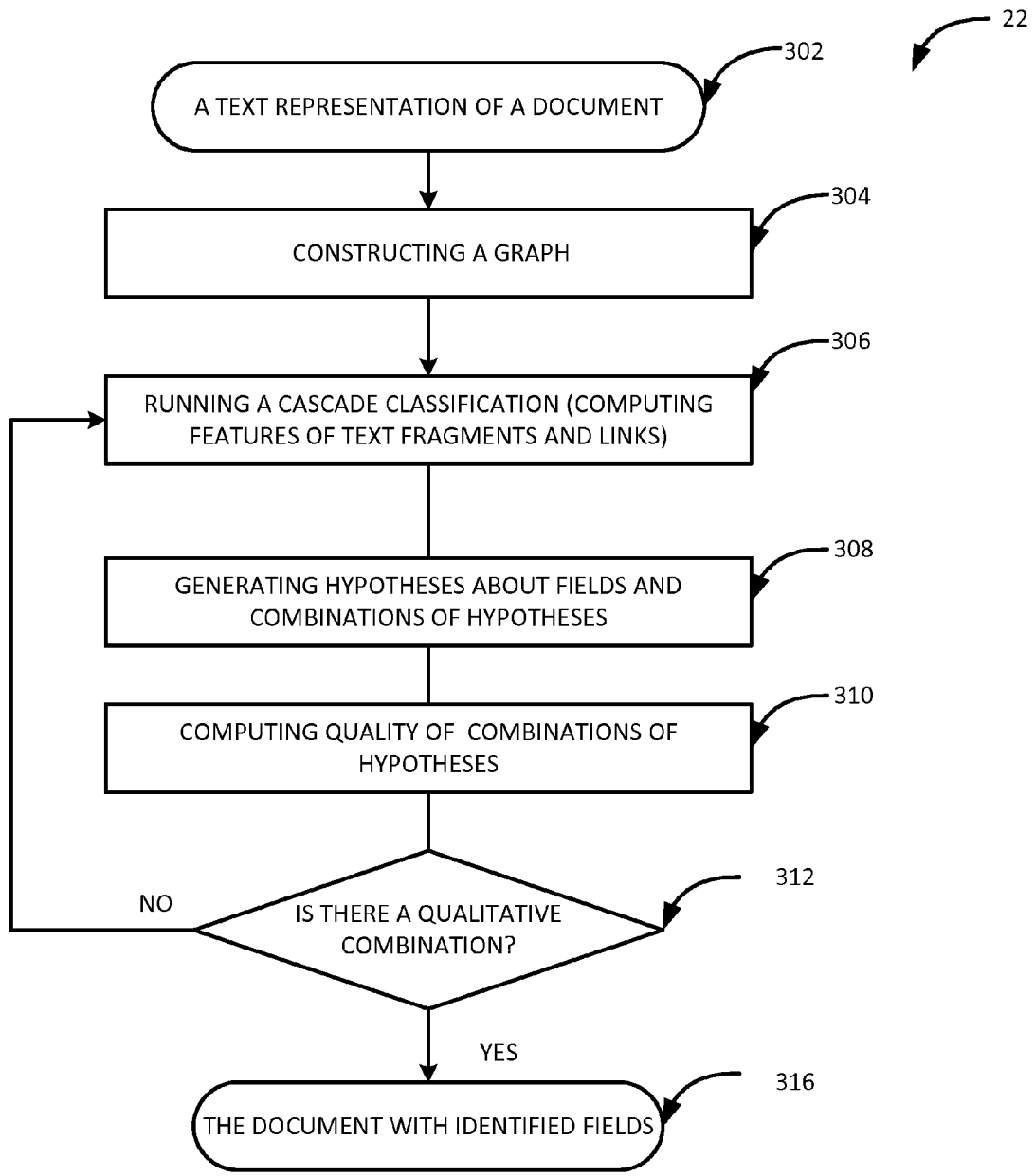
FIG. 3 illustrates the method of identifying the fields in a semi-structured document utilizing a graph and a cascade classification.

FIG. 3 illustrates the method of extracting data from a semi-structured document utilizing a graph and a cascading classification. In an illustrative example, a system for extracting the data from a semi-structured document receives a text representation of a document image (302). The text representation is a result of an optical character recognition (OCR) of the document image. At step 304 a graph is constructed to represent the recognized text of the document. Each node in the graph is matched with a word, a word combination, or a fragment of the text representation (such as, for example, fragment "www" in the "http://" address, or an ending of a last name), meaning that the number of the nodes in the graph is equal to or greater than the number of words in the text representation of the image of the document, and that each node is connected to all other nodes by edges.

At step 306 a cascade classification of identified text fragments of the document is performed. The cascade classification is a method for collecting information about features of text fragments, including computation of the text fragments' features, and about links between the text fragments. The cascade classification is an iterative process. The process of the cascade classification runs until the collected information about the text fragments and the links between them is adequate to generate hypotheses about the text fragments belonging to a particular document field. Each iteration in the cascade classification is a running of a particular procedure.

A procedure is a computer program function that processes a graph, calculates certain features for nodes and edges of the graph, and generates new features. Feature computation and feature generation is performed based on the previous data (calculated by the previous procedures). When a particular procedure is launched, the cascade principle is performed—the nodes corresponding to the text fragments that do not need to be processed with this particular procedure are disregarded.

For example, if during the processing of a text representation of a business card's image the first procedure in the cascade classification includes a font size determination, in which text fragments (nodes) within the business cards are divided into text fragments with corresponding type "small" and text fragments with the corresponding type "large", and the following procedure is, for example, searching for names in the document, than the nodes having value "small" of feature "size" will be cut off, and the second procedure will calculate values only for the nodes with the font size feature determined to be "large".

In another example, if during previous procedures a text fragment was identified as a class of numbers, and the next procedure is a search of keywords, this next procedure will not be applied to the "number" text fragment. Keywords are words which are associated with certain fields and which may be used to detect fields.

Figure 4:
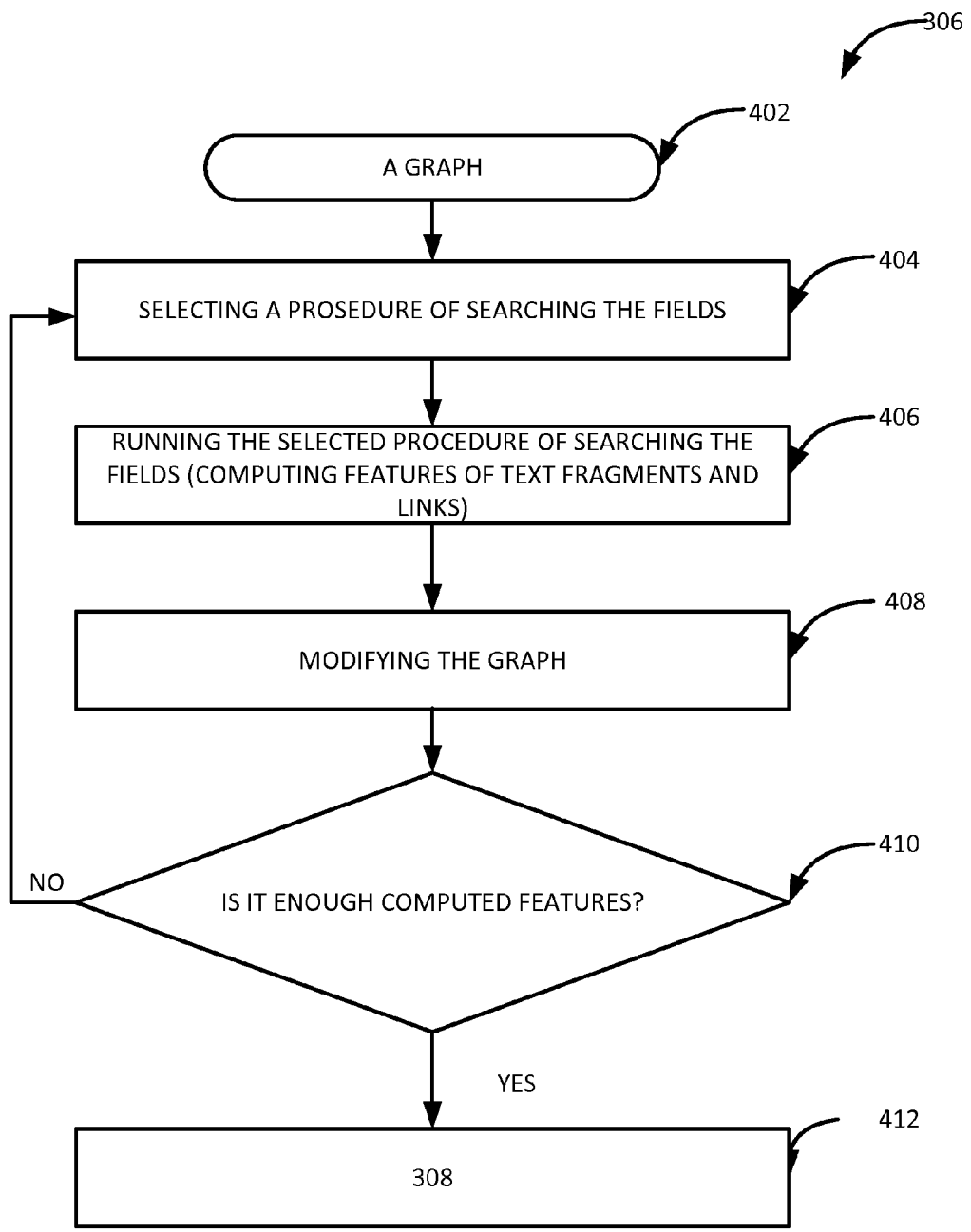
FIG. 4 illustrates the method of the cascade classification.

FIG. 4 illustrates a block diagram of the cascade classification of the text fragments. As an input the system receives a graph (402). The text fragments are nodes of the graph. The nodes of the graph are joined by edges (logical links between the text fragments) which set a linear order of recognized text within the document. There can also be other edges, alternative to linear order links.

At step 404 we select a procedure for field searching among the plurality of various procedures based on a resource consuming principle. It means that the most resource-saving procedures are selected first, and the most resource-intensive procedures are selected later. The resource-saving procedures are, for example, searching for text fragments, consisting of letters, or text fragments including numbers, or identifying text fragment by font size, etc. An example of the resource-intensive procedure is searching for fields using a large electronic dictionary.

At step 406 the procedure selected at step 404 is launched. The procedure analyzes all text fragments (or some portion of the fragments) and generates value for a feature or values for multiple features (numerical characteristic(s)). More details about the procedures and the features they identify will be provided below.

At the step 408, the graph is modified based on the values of the features identified by the procedure for all or some of the text fragments. Namely the features values in the nodes (text fragments), in the edges of the graph are updated. Also at this step any changes of the graph structure may be performed. For example, it may become necessary to split a text fragment, containing both letters and numbers, into two nodes to separate the letters from the numbers. This will be done by forming a new node, adding an edge from the old node to the new node, and moving the edges that were originating from the old node for the new node.

At step 410 we determine whether the received information (computed features) for the text fragments and their links is sufficient for generating one or more hypotheses about the types of fields associated with these text fragments.

If the information about the text fragments and the links is not sufficient, then the method moves to the step of selecting the next search procedure (404). The next procedure is selected based on the previously computed features. In one embodiment each subsequent procedure is more resource-intensive than the previous one. An example of a more resource-intensive procedure may be a procedure of searching for a text fragment satisfying a certain regular expression. A regular expression is a sequence of characters that forms a search pattern, mainly for use in pattern matching with strings.

If the information about the text fragments and their links is sufficient, then the cascade classification of the text fragments is completed.

Returning to FIG. 3, at step 308 the hypotheses about the text fragments belonging to certain fields of the document and their combinations are generated. The hypothesis generation is based on the information about the text fragments and their links calculated during the cascade classification 306. When hypotheses are generated, they are assigned certain confidence levels. The confidence level of a hypothesis depends on the values of features of the text fragments and their links. In one embodiment the confidence of the hypotheses is measured as a percentage from 0 to 100%. Multiple hypotheses with different or equal confidence levels may be generated for a single text fragment. As a result, several combinations of the hypotheses about the fields of the document may be generated. At step 310 a computing of quality of different combinations of hypotheses about the fields of the document is performed. The computed quality of the combinations of the hypotheses may be used for comparison the combinations of the hypotheses between each other. A number of metrics measuring the quality of the combination of the hypotheses is taken into consideration. The first metric is a cumulative metric of the confidence levels for a combination of the hypotheses. The cumulative metric of the confidence levels for all the hypotheses within the combination of the hypotheses is computed as a sum of the confidence levels computed for each text fragment with respect to the hypothesis. The higher the cumulative metric of the confidence levels of all the hypotheses within the combination, the better is the quality of the combination.

The second metric is a cumulative metric of fines of compatibility of different hypotheses within one combination. The cumulative metric of the fines for a combination of hypotheses is computed as a sum of the fines. In this metric the combinations of the hypotheses are fined based on certain rules describing specific fields, their characteristics, their arrangement regarding each other (the geometry of the fields) and possible structure of a document. The rules are usually created for a particular type of document. For example, in a business card the name field cannot be absent, there cannot be two name fields or several address fields located in different parts of the document, etc. The smaller cumulative metric of compatibility fines of the hypothesis, the better is the quality of this combination. The computed quality of a combination of hypotheses is at least in part based on the cumulative metric of confidences and the cumulative metric of fines.

In one embodiment at step 312 we determine whether a computed quality of a combination of hypotheses is above a predefined threshold value or whether there is a combination of hypotheses for the entire document of sufficient quality. If such combination is not found, then the method returns to step 306 and the process of obtaining additional characteristics of the text fragments and their links utilizing the cascade classification resumes. In this case, in one embodiment further more complicated (resource-intensive) procedure are used, for example, procedures that utilizes larger glossary. If a suitable combination of hypotheses is found, the analysis of the text of the document is considered completed, i.e., the fields in the image of the document are identified. In another embodiment at step 312 the combination of hypotheses with the highest computed quality is selected.

In the method of comparison of the combinations of the hypotheses described above for each combination of hypotheses its quality is computed, i.e. to each combination we attribute a numerical quality indicator that characterizes the quality of the whole combination of hypotheses. The best combination of hypotheses is chosen by comparing these quality indicators of combinations with each other and with a predefined threshold. Such comparison may not be very accurate. There is an alternative approach of comparing the combinations of hypotheses. In this approach, a set of the features or feature vector of one combination of hypotheses is compared with a set of features or feature vector of another combination of hypotheses. The feature vector of the combination of the hypotheses may include a list of fields and their links identified by the combination of the hypotheses. Selecting the best combination is based on a set of rules stored in the system for each document type. For example, as a result of the procedures for the business card document type, two combinations of hypotheses are generated. The feature vector of the first combination of hypotheses may include the following: the document contains two logically linked fields, wherein first field is Name, and the second field is Surname. The feature vector of the second combination of hypotheses may include the following: the document contains two logically linked fields, wherein first field is Name and the second field is Position (Job). A set of rules for business cards may include a rule according to which the best combination of hypotheses for business cards is a combination, which has both Name and Surname fields, and these fields are located next to each other (logically linked). In this example, the first combination of hypotheses wins, because the feature vector of this combination is more consistent with the rules. This alternative approach of comparison of the combinations of hypotheses is more accurate and allows to take into account more nuances.

Running procedures for ascertaining new or additional features should be performed in the order necessary for providing high quality classification. The order of running classifiers is determined either manually or automatically.

As an example of the method of cascade classification as used in the present invention, the need to recognize a plurality of sales receipts from several different stores is considered. The fields in sales receipts from the same store usually have the same geometrical structure—the locations of the fields, the font and other features do not vary on such sales receipts from the same vendor. Such features usually vary in their location and fonts on sales receipts from different stores or vendors. In order to classify sales receipts from different stores first it is necessary to run the vendors' search procedure, utilizing a dictionary with the vendors' names, i.e. to add the vendor's identification to the cascade classifier and if a vendor was identified, the rest of the fields will be identified utilizing the corresponding template connected with the vendor. If, for example, vendor's cash registers have not changed since the time of the template creation, the use of a current template will significantly speed up the process of extracting data.

In order to ascertain new features, the method of the present invention utilizes different heuristics for more precisely selecting several possible locations of one or another type of a certain field in the receipt. For example, a field corresponding to the name of the vendor often is located next to the field corresponding to the address. Therefore, if the location corresponding to the vendor field is known, then it is likely that the address text is located near the name of the vendor, so that the corresponding feature can be identified and introduced. Conversely, if the vendor name field is found, then we can find the address filed by utilizing the feature <<Text fragment locates near Vendor Name>>.

For searching the vendor's name field in sales receipts we can use the <<Text fragment locates in the first line>> feature.

One of the examples of using the heuristics in the method of the present invention applies to the case of variations of the features of a text fragment presented as a string of numbers (for example, " . . . 428"). Examples of the corresponding features are the following: a feature of a phone number, or a feature of the price of a purchased item or items, or a feature of the address (a number of the building, a portion of the zip code and the like).

Also the features can be in the form of a regular expression. An example of such feature is <<Text fragment satisfies regular expression for date format>> (for instance, MM/DD/YYYY).

Also the features can be in the form of frequent key words in documents, such as sales receipts—the combination "tel" corresponding to a phone number, the combination "total" corresponding to the total purchase price and so on.

Similarly, we can use keywords such as "thank you for coming to" to find the vendor's name field (corresponding feature is <<Text fragment is going after phrase "thank you for coming to">>). Similarly, the keyword <<address>> may be used to find the address field in a sales receipt or on a business card (corresponding feature is <<Text fragment is going after address label>> (such as "address")). The keyword <<company>> may be used to find the company name field on a business card (corresponding feature is <<Text fragment locates after company label>> (such as "company")).

The method and system of the present invention also contemplate using binary features in identifying desired fields in the image of the document. Extracting various entities from a document, such as a sales receipt, occurs automatically by training the system on recognizing binary features (i.e. by classification). For example, the binary feature for the entity corresponding to the field with the name of a vendor can be: the proximity of an address field, the presence of the quotation marks, the nearby presence of the words such as "Inc.", "LLC".

The keywords may be a part of a field. The examples of such features are <<Text fragment has street keyword in it>> (such as "St.", "avenue", "drive") or <<Text fragment has occupation words>> (such as "agent", "broker", "programmer"), or <<Text fragment has city name in it>>.

To find an internet address on a business card the following features can be used: <<Text fragment is located after <<url>> label>> (such as "web:", "url:"), <<Text fragment comprises symbols "www">> (Maybe not exactly "www", but something alike, such as "11w", <<Text fragment includes domain name>> (such as "com", "net"). Besides the listed examples of text fragments' feature, procedures can also compute the features links (edges) between the text fragments. The examples of such features are: <<The edge is between two compatible text fragments>> (such as several columns), <<The edge is between similar horizontal lines>>, <<The edge is between words>>, <<The edge is over a punctuation mark>>, <<The edge is derived by a finder>>.

In the cases when only some of the fields need to be identified and extracted (for example, when only the fields corresponding to the name of a vendor and the total purchase price are needed), the method of cascade classification invokes only some of its procedures which are necessary for the correct identification of only those desired fields.

An example of the identification of a vendor's phone number in a sales receipt is now considered as an illustration of the described method. In order to quickly identify the phone number, regular expressions of possible symbols (digits in this case), and their order that is commonly used for providing phone numbers, can be used.

If all the analyzed text fragments of the document were successfully classified, meaning that no unidentified fragments are left in the document, or that the cascade classification was stopped based on a decision, then the identification process can be completed. The identification can be completed if no conflict occurred during the classification, i.e. there were no occurrences of matching one text fragment with several conflicting classes (types), such as "corresponds to a phone number" and 'does not correspond to a phone number".

In case when conflicts have arisen during the classification process, other methods of classification can be utilized. Such other methods are classification by keywords, geometry of the fields in a document and so on. For example, phone and fax numbers are easily mixed up, but the classification procedure by a keyword pointing only to a phone number or a fax number can be effective in identification the desired number correctly.

It is contemplated by the present invention that the inventive method can use an electronic dictionary (a dictionary), but in certain implementations of the method a dictionary is not needed. The following example is helpful in illustrating the embodiment when a dictionary is used. When extracting data from the fields in images of semi-structured documents using the method described above, many search procedures use specialized dictionaries. For example, to identify the "name" field, a search procedure uses a specialized dictionary of names; to identify the "address" field, a search procedure uses specialized dictionaries of streets and cities; to identify the "occupation" field a search procedure uses a specialized dictionary of professions, positions, and occupations; to identify fields that are usually accompanied by keyword, such as Tel, Fax, ph, T, F. Total, etc., a search procedure that uses a specialized dictionary of keywords is involved. Words found in a specialized dictionary can be different for different languages and/or countries. Dictionary words are used as features of the fields.

Because of the OCR errors in the text received as a result of image document recognition, it can be impossible to find an incorrectly recognized word/keyword in a dictionary. That is especially problematic with short CJK words. If a dictionary is used by a search procedure to identify a field, and there is an OCR error in the word, then this word will not be found in the dictionary. This means that the corresponding feature may not be computed properly utilizing the specialized dictionary and the field may not be identified correctly.

The above-described problem of dictionary use is solved in the present invention by using a reduced alphabet technique. The essence of the reduced alphabet technique is the following. Let us suppose there is an initial alphabet A. Hereinafter an alphabet is a generic term for a set of characters that may include numbers, letters, punctuation marks, and/or mathematical and special symbols. In forming our reduced alphabet, first we group together characters from the alphabet A if these characters can be easily confused for one another. From each of these groups we choose a meta-representative character. The set of meta-representative characters of the groups forms a new alphabet B, where the set of characters in alphabet B is a subset from the characters of alphabet A. During the construction of alphabet B from alphabet A, we mapped the set of characters of alphabet A into the set of characters from the alphabet B (f: A→B). Now we search a word in a specialized dictionary using alphabet B.

Combining of symbols into groups can be implemented based on OCR error statistics. Namely, if there is a reference text and a recognized version of the same text, we can identify the characters that were recognized incorrectly, i.e. mixed up during the recognition process with high frequency. For example, on the basis of this data, the following characters may be grouped as easily confused for one another: "YyUu", "AaAa", "HhHн", "OoOo0", "UuИи" etc. from English and Russian alphabets. Such characters that can be easily confused for one another are grouped together.

For each such group a meta representative character is either selected or created. For example, a group of characters "YyYy" can be represented by one character "Y".

Each character from the initial alphabet covered by UTF32 encoding is represented by 4 bytes. A character from the reduced alphabet may be represented by a smaller number of bytes. As a result, replacing the characters from the initial alphabet by the characters from the reduced alphabet may substantially reduce the size of the storage space necessary for storing the dictionary.

The meta representative characters of different groups form a reduced alphabet. As a result, the reduced alphabet consists of the characters/symbols/letters which either cannot be confused for one another, or which are hard to confuse with any other character. The results of the recognition process of a semi-structured document and the words in a specialized dictionary can be represented using this reduced alphabet. By replacing letters in the specialized dictionary with corresponding meta representative characters we convert the specialized dictionary into a reduced alphabet dictionary.

Figure 7:
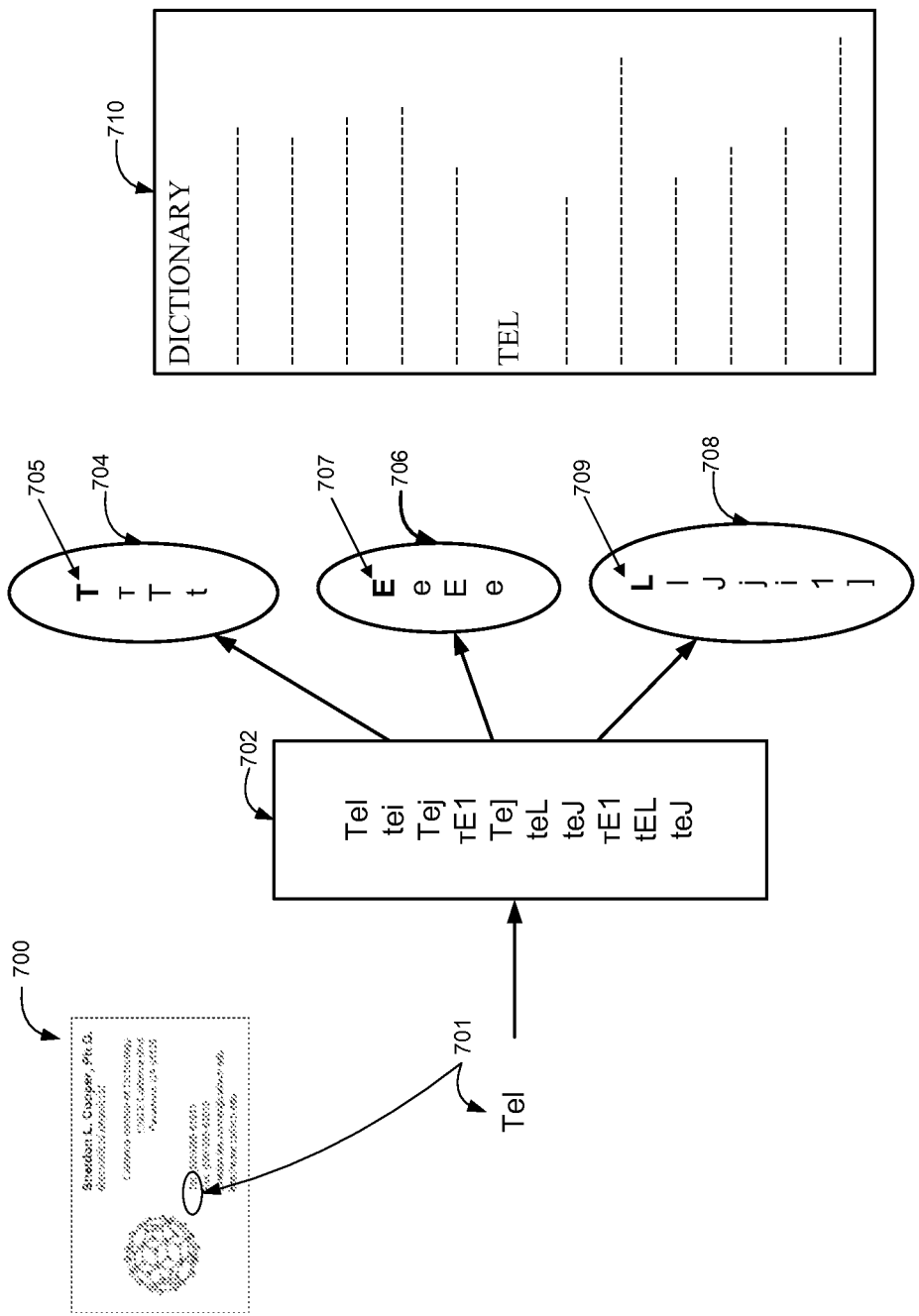
FIG. 7 illustrates an example of word representing in a dictionary using the technique of the reduced alphabet.

FIG. 7 illustrates an example of a word represented in a specialized dictionary using the technique of the reduced alphabet. As shown in FIG. 7 a business card 700 contains a phone number field, and this field is accompanied by <<Tel>> keyword 701. During recognition process <<Tel>> can be recognized with different errors. FIG. 7 lists some of the variants of recognition of the word "Tel" with errors 702. Based on these examples and comparison of different versions of recognition character groups can be identified (704, 706 and 708). In these groups, meta representative characters are identified. In FIG. 7 the identified meta representative characters (705, 707, 709) are marked bold. For groups 704, 706 and 708 they are <<T>>, <<E>>, and <<L>> respectively. In the reduced alphabet dictionary 710 "Tel" word will be represented with the help of these meta representative characters as the word <<TEL>>.

The reduced alphabet dictionary provides not only correct identification of the document fields, in spite of possible OCR errors in word/keywords, but can also help to correct these errors. For this purpose, the reduced alphabet dictionary has a special structure. A structural unit of the reduced alphabet dictionary is a word in the reduced alphabet. In one embodiment the words in the reduced alphabet dictionary are stored with their related source word(s) and with the associated with these source word set(s) of versions of recognition of these source word with OCR errors. If the word in the reduced alphabet is associated with only one source word and, accordingly, with only one set of versions of recognition of the source word with OCR errors, then the incorrect spelling of the source word may be corrected by using the reduced alphabet dictionary.

Figure 8:
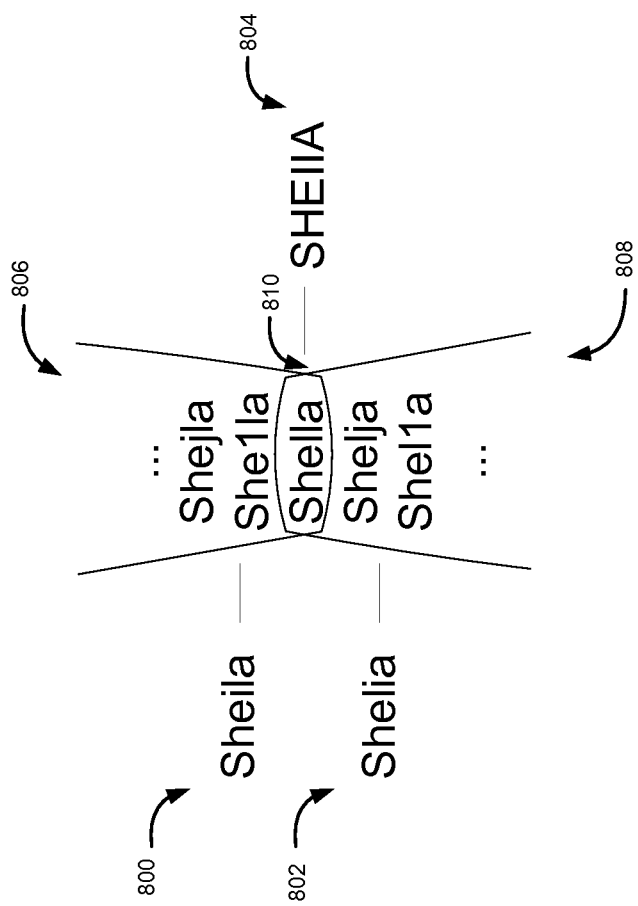
FIG. 8 illustrates an example of a word in the reduced alphabet that corresponds to two source words.

FIG. 8 illustrates a more complicated case where one word in the reduced alphabet corresponds to two source words. In FIG. 8 the two source words are Sheila (800) and Shelia (802). Using the reduced alphabet Sheila and Shelia words (800 and 802) may be represented as SHEIIA word (804), because the sets of versions of recognition of these two source words intersect (806 and 808). In this case, the incorrect spelling of the source word may be corrected by using the reduced alphabet dictionary if the erroneous versions of recognition do not fall in the intersected subset (810).

If the alphabet consists of hieroglyphs, such alphabet also can be divided into several groups and the result of recognizing a hieroglyph will be a group containing that hieroglyph, and not the code of that hieroglyph. As a result, the words are entered into the dictionary using a certain narrowed alphabet.

Thus, even if the character in the key word has been recognized incorrectly, the corresponding keyword will still be found in the dictionary, associated with the keyword field, and will be correctly identified.

Figure 6:
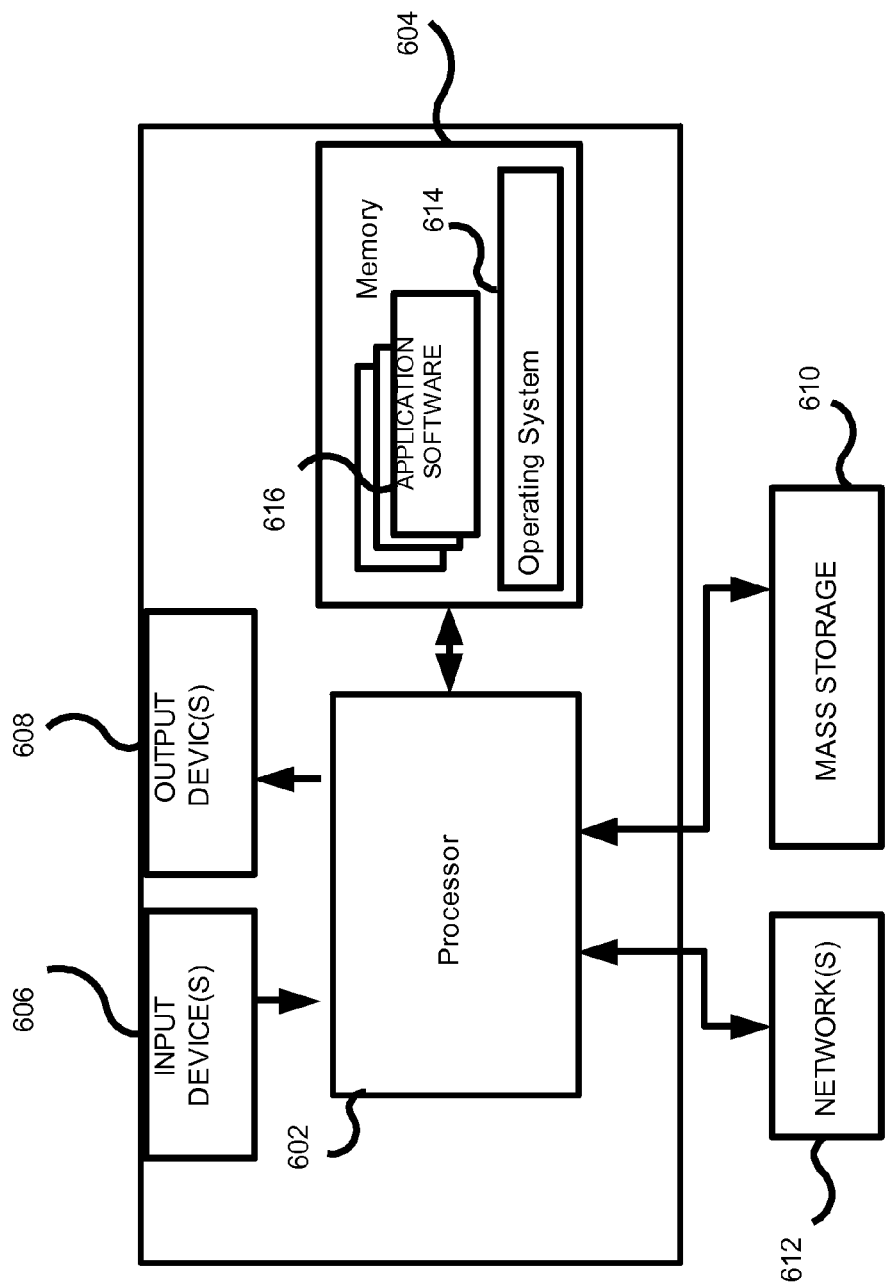
FIG. 6 provides a general architectural diagram for various types of computers and other processor-controlled devices.

FIG. 6 shows exemplary hardware for implementing the techniques and systems described herein, in accordance with one implementation of the present disclosure. Referring to FIG. 6, the exemplary hardware includes at least one processor 602 coupled to a memory 604. The processor 602 may represent one or more processors (e.g. microprocessors), and the memory 604 may represent random access memory (RAM) devices comprising a main storage of the hardware, as well as any supplemental levels of memory, e.g., cache memories, non-volatile or back-up memories (e.g. programmable or flash memories), read-only memories, etc. In addition, the memory 604 may be considered to include memory storage physically located elsewhere in the hardware, e.g. any cache memory in the processor 602 as well as any storage capacity used as a virtual memory, e.g., as stored on a mass storage device 610.

The hardware also typically receives a number of inputs and outputs for communicating information externally. For interface with a user or operator, the hardware \ may include one or more user input devices 606 (e.g., a keyboard, a mouse, imaging device, scanner, microphone) and a one or more output devices 608 (e.g., a Liquid Crystal Display (LCD) panel, a sound playback device (speaker)). To embody the present invention, the hardware typically includes at least one screen device.

For additional storage, the hardware may also include one or more mass storage devices 610, e.g., a floppy or other removable disk drive, a hard disk drive, a Direct Access Storage Device (DASD), an optical drive (e.g. a Compact Disk (CD) drive, a Digital Versatile Disk (DVD) drive) and/or a tape drive, among others. Furthermore, the hardware may include an interface with one or more networks 612 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor 602 and each of the components 604, 606, 608, and 612 as is well known in the art.

The hardware operates under the control of an operating system 614, and executes various computer software applications, components, programs, objects, modules, etc. to implement the techniques described above. Moreover, various applications, components, programs, objects, etc., collectively indicated by application software 616 in FIG. 6, may also execute on one or more processors in another computer coupled to the hardware via a network 612, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as a "computer program." A computer program typically comprises one or more instruction sets at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally to actually effect the distribution regardless of the particular type of computer-readable media used. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

Aspects of the present disclosure have been described above with respect to techniques for machine interpretation of information in text documents. However, it has been contemplated that fragments of this disclosure may, alternatively or additionally, be implemented as separate program products or elements of other program products.

All statements, reciting principles, aspects, and embodiments of the disclosure and specific examples thereof are intended to encompass both structural and functional equivalents of the disclosure.

It will be apparent to those skilled in the art that various modifications can be made in the devices, methods, and program products of the present disclosure without departing from the spirit or scope of the disclosure. Thus, it is intended that the present disclosure includes modifications that are within the scope thereof and equivalents.

What is claimed is:

1. A method of extracting data from one or more fields in an image of a document, the method comprising:
    obtaining a text representation of the image of the document;
    constructing a graph for storing one or more features values of one or more text fragments in the text representation of the image of the document and one or more links between the one or more text fragments;
    computing one or more features of the one or more text fragments and the one or more links using a cascade classification;
    generating one or more hypotheses about the one or more text fragments belonging to the one or more fields in the image of the document;
    generating one or more combinations of the one or more hypotheses;
    selecting a combination of the one or more hypotheses; and
    extracting data from the one or more fields in the image of the document based on the selected combination of the one or more hypotheses.

2. The method of claim 1, wherein the text representation of the image of the document is a result of an optical character recognition (OCR).

3. The method of claim 1, wherein the graph comprises nodes, edges and features values of the nodes and the edges and wherein constructing the graph further comprises:
    matching the node of the graph to words, word combinations, or word fragments of the text representation of the image of the document; and
    connecting the nodes in a linear order by the edges.

4. The method of claim 1, wherein computing the one or more features of the one or more text fragments and the one or more links comprises receiving the features values of the one or more text fragments and the one or more links.

5. The method of claim 1, wherein the computing the one or more features of the one or more text fragments and the one or more links comprises:
    selecting a procedure for the computing of the one or more features of the one or more text fragments and the one or more links;
    running the selected procedure to compute at least one of the features for the one or more text fragments or the one or more links; and
    modifying the graph based on the computed at least one feature of the features for the one or more text fragments or the one or more links.

6. The method of claim 5, wherein the modifying of the graph comprises one or more of:
    merging nodes, splitting nodes, removing edges, adding edges, changing features values of the nodes, and changing the features values of the edges.

7. The method of claim 1, wherein the generating the one or more hypotheses about the one or more text fragments belonging to the one or more fields in the image of the document is at least in part based on the computed one or more features of the one or more text fragments and the one or more links.

8. The method of claim 1, wherein the selecting of the combination of the one or more hypotheses is based on a computed quality of the one or more combinations of the one or more hypotheses.

9. The method of claim 8, wherein the selecting of the combination of the one or more hypotheses based on the computed quality of the one or more combinations of the one or more hypotheses comprises:
    for each combination of the one or more hypotheses:
        computing cumulative metric of confidences for the combination of the one or more hypotheses; and
        computing cumulative metric of fines for the combination of the one or more hypotheses; and
    selecting the combination of the one or more hypotheses with a highest computed quality,
    wherein the computed quality is at least in part based on the cumulative metric of confidences and the cumulative metric of fines.

10. The method of claim 1, wherein the selecting of the combination of the one or more hypotheses is based on comparing a feature vector of one combination of the one or more hypotheses with a feature vector of another combination of the one or more hypotheses.

11. The method of claim 5, wherein the running of the selected procedure further comprises using one or more electronic dictionaries.

12. The method of claim 5, wherein the running of the selected procedure further comprises using a reduced alphabet.

13. The method of claim 1, wherein the image of the document is a sales receipt or a business card.

14. The method of claim 1, wherein computing the one or more features of the one or more text fragments and the one or more links further comprises:
- combining easily confused characters from a first alphabet into groups based on OCR error statistic;
- selecting a meta-representative character for each of the groups;
- constructing a reduced alphabet using the meta-representative characters of the groups;
- converting the text representation of the image of the document using the reduced alphabet; and
- converting one or more electronic dictionaries using the reduced alphabet.

15. The method of claim 14, wherein the computing the one or more features of the one or more text fragments and the one or more links further comprises searching for a word from the converted text representation of the image of the document in the one or more converted electronic dictionaries.

16. A method of extracting data from one or more fields in an image of a document using a reduced alphabet, the method comprising:
- combining, by a processor, easily confused characters from a first alphabet into groups based on OCR error statistic;
- selecting, by the processor, a meta-representative character for each of the groups;
- constructing, by the processor, a reduced alphabet using the meta-representative characters of the groups.

17. The method of claim 16 further comprising, converting, by the processor, one or more electronic dictionaries using the reduced alphabet.

18. The method of claim 17 further comprising converting, by the processor, text representation of the image of the document using the reduced alphabet.

19. The method of claim 18 further comprising, computing one or more features of one or more text fragments and one or more links between the text fragments using the converted text representation of the image of the document and the one or more converted electronic dictionaries.

* * * * *

UNITED STATES PATENT AND TRADEMARK OFFICE
CERTIFICATE OF CORRECTION

PATENT NO. : 9,754,176 B2  
APPLICATION NO. : 14/868683  
DATED : September 5, 2017  
INVENTOR(S) : Mikhail Kostyukov Page 1 of 1

It is certified that error appears in the above-identified patent and that said Letters Patent is hereby corrected as shown below:

On the Title Page

Item (73) the Assignee, delete "ABBYY PRODUCTION LLC" and insert --ABBYY Development LLC--

Signed and Sealed this  
Nineteenth Day of December, 2017

Joseph Matal  
*Performing the Functions and Duties of the*  
*Under Secretary of Commerce for Intellectual Property and*  
*Director of the United States Patent and Trademark Office*